United States Patent
Hallberg et al.

(10) Patent No.: US 11,952,813 B2
(45) Date of Patent: Apr. 9, 2024

(54) VEHICLE DOOR POSITIONING HOLDER

(71) Applicant: Ningbo Geely Automobile Research & Development Co., Ltd., Ningbo (CN)

(72) Inventors: Linus Hallberg, Säve (SE); Martin Edberg, Gothenburg (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 628 days.

(21) Appl. No.: 17/140,464

(22) Filed: Jan. 4, 2021

(65) Prior Publication Data

US 2021/0123272 A1 Apr. 29, 2021

Related U.S. Application Data

(63) Continuation of application No. PCT/CN2019/094252, filed on Jul. 1, 2019.

(30) Foreign Application Priority Data

Jul. 11, 2018 (EP) .................................. 18182935

(51) Int. Cl.
*E05C 17/30* (2006.01)
*E05F 3/10* (2006.01)
(Continued)

(52) U.S. Cl.
CPC .............. *E05C 17/305* (2013.01); *E05F 3/10* (2013.01); *E05F 3/12* (2013.01); *F15B 13/0401* (2013.01);
(Continued)

(58) Field of Classification Search
CPC ......... E05C 17/305; F16F 9/5126; F16F 9/56; Y10S 16/17; Y10S 16/09
(Continued)

(56) References Cited

U.S. PATENT DOCUMENTS 523,648 A * 7/1894 Punzelt ..................... F16F 9/56
188/300
4,670,939 A * 6/1987 Fisher ..................... E05F 3/223
16/323

(Continued)

FOREIGN PATENT DOCUMENTS

CN 102235127 A 11/2011
CN 105593447 A 5/2016
(Continued)

OTHER PUBLICATIONS

International Search Report from corresponding International Application No. PCT/CN2019/094252, dated Oct. 11, 2019, 2 pages.

*Primary Examiner* — Amy R Weisberg
*Assistant Examiner* — Veronica M Shull
(74) *Attorney, Agent, or Firm* — Tucker Ellis LLP

(57) ABSTRACT

A vehicle door positioning holder includes a hydraulic cylinder connected to the door and a vehicle chassis, and a brake hydraulically connected in a loop. The cylinder pushes hydraulic fluid in the loop when the door is moved. The brake includes first and second chambers hydraulically connected to the loop and a third chamber connected in the loop at respective ends to the first and second chambers. The brake has a ball element in the third chamber when the hydraulic fluid is still, moved towards the first chamber as the hydraulic fluid flows in a first direction, and moved towards the second chamber as the hydraulic fluid flows in a second direction. A flow resistance of the hydraulic fluid is larger when the ball is positioned in the third chamber than when the ball is moved towards the first or the second chambers.

17 Claims, 6 Drawing Sheets

(51) Int. Cl.
    *E05F 3/12*       (2006.01)
    *F15B 13/04*     (2006.01)
    *F15B 13/042*    (2006.01)

(52) U.S. Cl.
    CPC ....... *F15B 13/042* (2013.01); *E05Y 2900/531* (2013.01); *F15B 2211/428* (2013.01)

(58) Field of Classification Search
    USPC ...... 296/146.1, 146.11, 146.4, 146.12; 16/82
    See application file for complete search history.

(56) References Cited

U.S. PATENT DOCUMENTS

| | | | | |
|---|---|---|---|---|
| 4,674,230 | A | * | 6/1987 | Takeo .................... E05F 15/47 49/31 |
| 8,857,889 | B2 | * | 10/2014 | Wellborn ............. E05C 17/203 16/85 |

FOREIGN PATENT DOCUMENTS

| | | |
|---|---|---|
| DE | 4140639 A1 | 1/1993 |
| DE | 4239681 A1 | 6/1994 |
| DE | 4404467 A1 | 8/1995 |
| DE | 10046723 A1 | 7/2002 |
| DE | 102004044782 B3 | 11/2005 |
| DE | 102005025475 A1 | 12/2006 |
| EP | 1387110 A1 | 2/2004 |
| GB | 1161859 A | 8/1969 |
| GB | 2348475 A | 10/2000 |
| JP | 2014136862 A | 7/2014 |

* cited by examiner

VEHICLE DOOR POSITIONING HOLDER

RELATED APPLICATION DATA

This application is a continuation of International Patent Application No. PCT/CN2019/094252, filed Jul. 1, 2019, which claims the benefit of European Patent Application No. 18182935.9, filed Jul. 11, 2018, the disclosures of which are incorporated herein by reference in their entireties.

TECHNICAL FIELD

The present invention relates to the field vehicles and more specifically to vehicle door positioning holders for keeping a door in an open position after it is opened.

BACKGROUND

Vehicle door positioning holders usually comprise a non-continuous solution, resulting in the car doors having approximately three different possible positions.

In order to be able to exit a car when parked next to other cars, the door must be possible to open as far as possible without hitting the car next by. If the door only has a few positions where it can be snapped in position, the car occupant usually ends up either exiting the car while firmly grabbing the door, exiting the car with the door opened much less than could be achieved or letting the door hit the car parked next by. If the car door is not restricted from movement it will move too much and can hit things in its way and a user of the vehicle.

SUMMARY

The inventors have identified that there is a need for enabling a vehicle door to open as far as possible without hitting another vehicle or wall. Further, there is a need for being able to position the door in any intermediate position between a closed position and an open position. Further, there is a need for a solution that does not rely on friction, since such a solution often has a relatively short lifetime before it does not hold the position of the door in an intended way.

In this disclosure, a solution to the problem outlined above is proposed. In the proposed solution, a vehicle door positioning holder for positioning a vehicle door in an open position, comprising a hydraulic cylinder and a brake hydraulically connected in a loop to the hydraulic cylinder, wherein:
  the hydraulic cylinder is configured to be connected to the vehicle door and to a chassis of the vehicle and to push a hydraulic fluid in the loop when the vehicle door is moved between the open and closed position,
  the brake comprises a first chamber hydraulically connected to the loop and a second chamber hydraulically connected to the loop, and a third chamber with a circular cross section and connected in the loop by that it in a first end is hydraulically connected to the first chamber and in a second end is hydraulically connected to the second chamber,
  the brake further comprises a ball element configured to be
    positioned in the third chamber when the hydraulic fluid is still,
    moved by the hydraulic fluid towards the first chamber as the hydraulic fluid flows in a first direction in the loop, and
    moved by the hydraulic fluid towards the second chamber as the hydraulic fluid flows in a second direction in the loop,
  wherein a flow resistance of the flow of the hydraulic fluid in the loop is larger when the ball element is positioned in the third chamber than when the ball element is moved towards the first or the second chamber.

By having a vehicle door positioning holder comprising hydraulic loop and a hydraulic brake. The brake exerts a first brake force, when the ball element is positioned in the third chamber, on the door when it is still and starts moving between the open and the closed position and exert a second brake force, when the ball element is moved towards the first and second chamber, that is lower than the first brake force the door when it is moving. The vehicle door positioning system can move the door of a vehicle in a continuous way and at the same time hold it in any intermediate position. By flow resistance is meant the resistance that has to be overcome to make the hydraulic fluid flow in the loop.

According to an aspect the flow resistance of the flow of the hydraulic fluid in the loop applied by the brake is zero or substantial zero when the ball element is moved towards the first or the second chamber.

According to an aspect the brake comprises a first resilient element configured exert a counteracting force on the ball element when it is moved towards the first chamber and a second resilient element configured to exert a counteracting force on the ball element when it is moved towards the second chamber.

According to an aspect the third resilient element is pre-tensioned to hold the ball element in the first position According to an aspect the first and the second resilient elements are configured to interact to position the ball element in the third chamber when the hydraulic fluid is still in the loop.

According to an aspect a cross sectional area of the first chamber and the second chamber is larger than a cross sectional area of the third chamber. The cross sectional area is the cross sectional area in view of the flow in the loop.

According to an aspect a volume of the first chamber and the second chamber is larger than a volume of the third chamber.

According to an aspect the first and the second chambers comprises a flow-regulating element moveable between a first position and a second position and wherein the flow resistance of the flow of the hydraulic fluid in the loop is larger when the flow-regulating element is positioned in the first position than when it is positioned in the second position.

According to an aspect the regulating element has a ring shape with a central hole, wherein a diameter of the ball element is larger than a diameter of the central hole.

According to an aspect the first and the second chambers comprises a third resilient element configured to exert a counteracting force on the flow-regulating element when it is moved from the first position towards the second position.

According to an aspect the first and the second chambers comprise a lock configured to lock the flow-regulating element in the second position.

According to an aspect the lock comprise a hook and a flange configured to interact with the hook in order to lock the flow-regulating element in the second position.

According to an aspect the lock comprises an unlocking device configured to unlock the flow-regulating element in the second position.

According to an aspect the first and the second chambers comprises a fourth resilient element connected to the unlocking device and wherein the fourth resilient element is configured to exert a force on the unlocking device to move it towards the flow-regulating element and to unlock the regulating element from the second position.

According to an aspect the third chamber have an hourglass shape with a smallest diameter corresponding to the diameter of the ball element.

According to an aspect the third chambers have a cylindrical shape.

According to an aspect the third chambers have a shape that is a combination of the hourglass shape and the cylindrical shape According to an aspect the ball element is configured be moved, by the hydraulic fluid, from a position in the third chamber, to make contact with the flow-regulating (40) and to move the flow-regulating element (40) from the first position to the second position and to lock the lock (50), wherein the flow resistance in the loop (L) is lower after the flow resistance element (40) has been locked in the second position than when it is in the first position and when it is moved from the first position towards the second position.

According to an aspect the first and the second chambers have a cylindrical shape.

According to an aspect the first and second chamber comprise a cone shaped part at the transition from the first and second chambers to the third chamber.

According to an aspect the first chamber in a first end is connected to a first outlet of the brake and the second chamber in a first end is connected to a second outlet of the brake.

Generally, all terms used in the claims are to be interpreted according to their ordinary meaning in the technical field, unless explicitly defined otherwise herein. All references to "a/an/the [element, device, component, means, etc.]" are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments and aspects.

DETAILED DESCRIPTION

Figure 1:
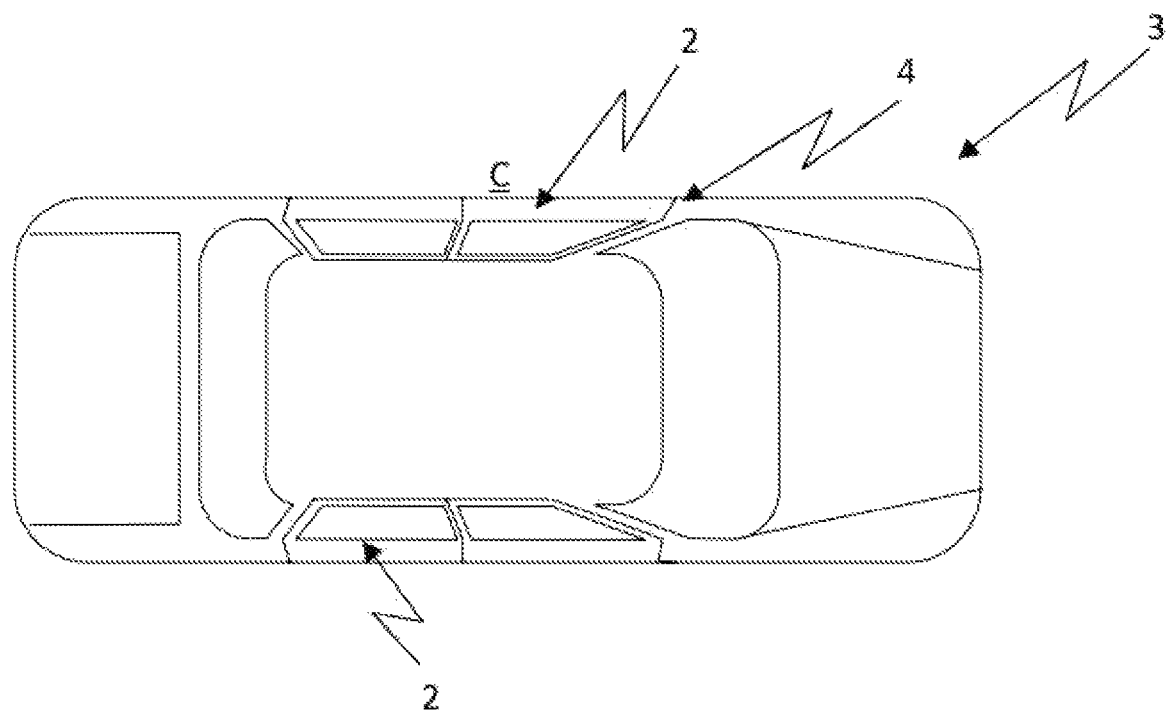
FIG. 1 discloses a schematic view of a vehicle comprising a vehicle door positioning holder according to the invention with a door in a closed position.

The present invention will now be described more fully hereinafter with reference to the accompanying drawings, in which exemplary embodiments and aspects of the invention are shown. The invention may, however, be embodied in many different forms and should not be construed as limited to the embodiments and aspects set forth herein; rather, these embodiments and aspects are provided for thoroughness and completeness. Like reference characters refer to like elements throughout the description. The drawings are not necessarily to scale and certain features may be exaggerated in order to better illustrate and explain the exemplary embodiments of the present invention.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps in the method can occur out of the order noted in the operational illustrations. For example, two steps shown in succession can in fact be executed substantially concurrently or the steps can sometimes be executed in the reverse order, depending upon the functionality/acts involved.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Although the invention will be described in relation to a car, the invention is not restricted to this particular vehicle, but may as well be installed in other type of vehicles such as minivans, recreational vehicles, off-road vehicles, trucks, buses or the like.

Figure 2:
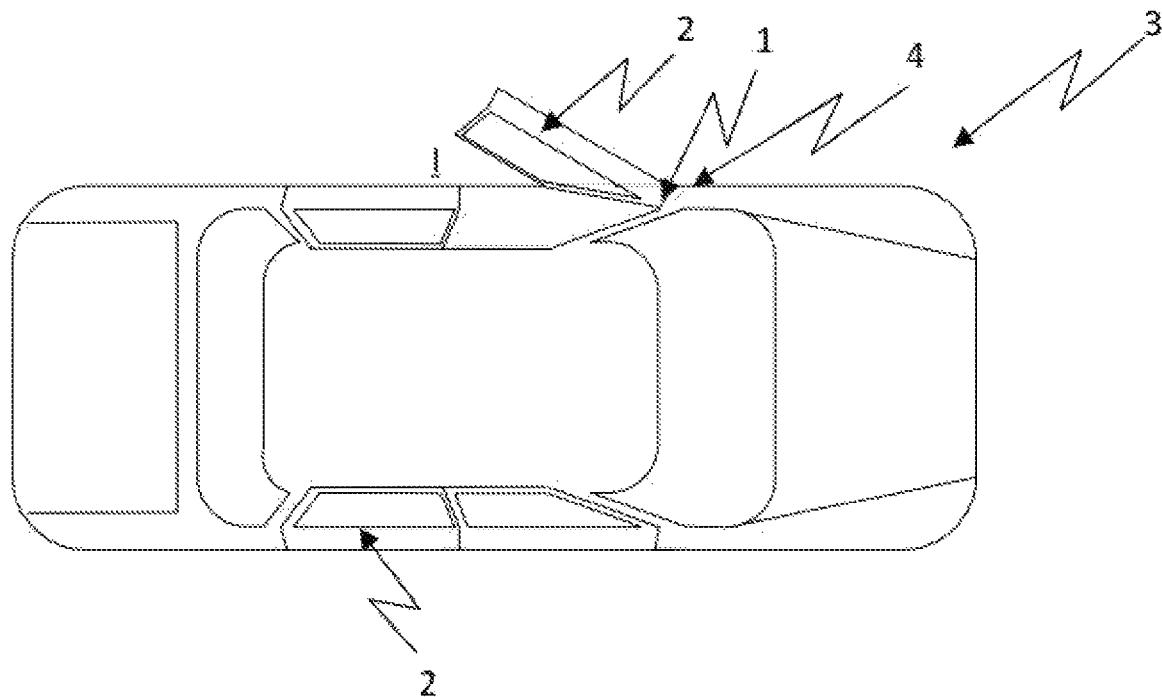
FIG. 2 discloses a schematic view of the vehicle comprising a vehicle door positioning holder in FIG. 1 with the door in an intermediate position.
Figure 3:
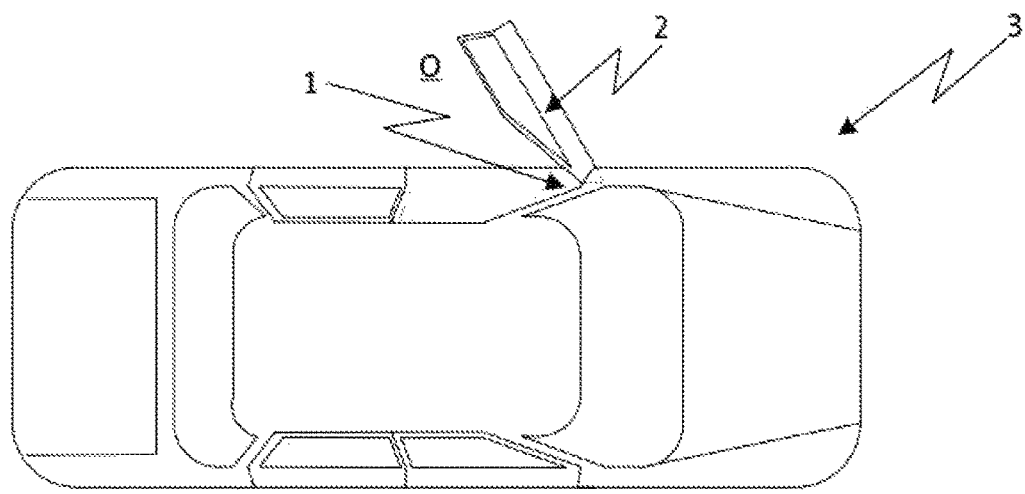
FIG. 3 discloses a schematic view of the vehicle comprising a vehicle door positioning holder in FIGS. 1 and 2 with the door in an open position.

In FIG. 1-3, to which now is referred to, discloses a vehicle 3 comprising doors 2 and a vehicle door positioning holder 1 according to the invention. The door 2 is moveable between a closed position C, as disclosed in FIG. 1, to an open position O, as disclosed in FIG. 3. The door 2 is moveable from the closed position C towards the open position O and could be held still in any intermediate position I, as disclosed in FIG. 2, between the open and closed position O, C. The door 2 is moveable from the intermediate position I towards the open position O. The door 2 is moveable from the open position O or the intermediate position I towards the closed position C.

If the door 2 of the vehicle should be opened a user of the vehicle 1, i.e. a driver or a passenger, unlocks the door 2 and move it between the open, intermediate and closed position O, I, C. The door 2 could be moved from the outside of the vehicle 2 or from the inside of the vehicle 2.

Figure 4:
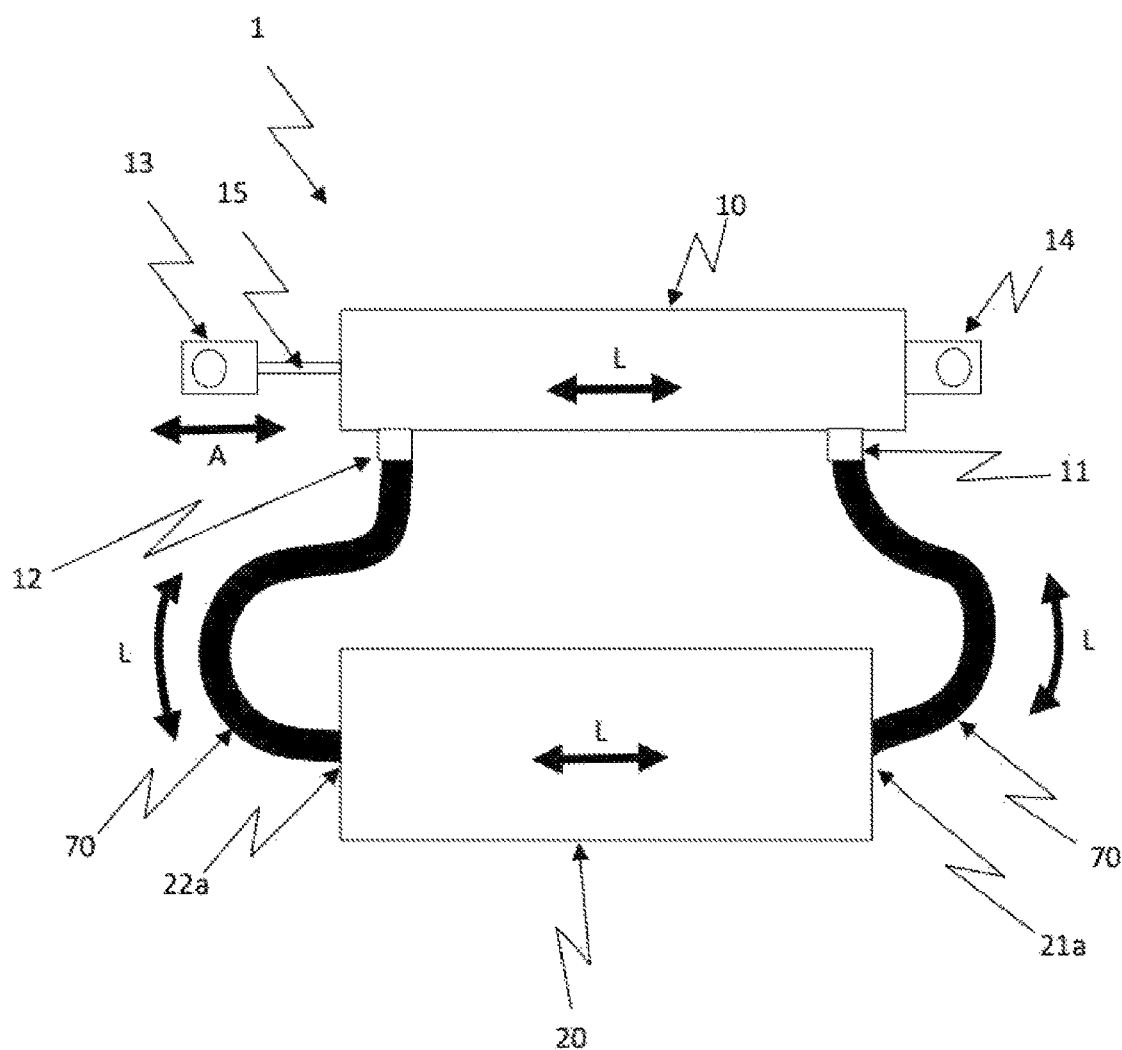
FIG. 4 discloses a schematic view of a vehicle door positioning holder according to the invention.

The vehicle door positioning holder 1 is connected to a chassis 4 of the vehicle 1 and to the door 2 of the vehicle 1. In FIG. 4, to which now is referred to, discloses a vehicle door positioning holder 1. The vehicle door positioning holder 1 comprises a hydraulic cylinder 10 and a brake 20.

The hydraulic cylinder 10 comprises a cylinder and a piston 15. The hydraulic cylinder 10 comprises a first outlet 11 and a second outlet 12. The piston 15 comprises a first mounting element 13 at its outer end. The mounting element 13 is configured to be connected to the door 2 of the vehicle 3 or to the chassis 4 of the vehicle 3. The hydraulic cylinder 10 further comprises a second mounting element 14. The second mounting element 14 is configured to be connected to the door 2 of the vehicle 3 or to the chassis 4 of the vehicle 3. When the vehicle door positioning holder 1 is connected to the vehicle 1, the first mounting element 13 is connected to the door 2 of the vehicle 3 or to the chassis 4 of the vehicle 3 and the second mounting element 14 is connected of the other of the door 2 of the vehicle 3 and the chassis 4 of the vehicle 3. When the door 2 is moved from the open position O towards the closed position C the piston 15 is moved inside the cylinder and a hydraulic fluid is moved from the first outlet 11 or the second outlet 12 towards the other of the first outlet 11 or the second outlet 12. When the door 2 is moved in the opposite direction, i.e. from the closed position C towards the open position O the hydraulic fluid is moved in the opposite direction.

The brake 20 is hydraulically connected in a loop L to the hydraulic cylinder 10. The hydraulic fluid is configured to flow back and forward in the loop L, as is indicated with arrows in FIG. 4, when the piston 15 is moved back and forward, as is indicated by the arrow Ain FIG. 4. The brake 20 is connected to the first outlet 11 of the hydraulic cylinder 10 and to the second outlet 12 of the hydraulic cylinder 10. The brake 20 according to an aspect is connected to the first outlet 11 in a first end 26 and to the second outlet 12 in a second end 27. The brake 20 is connected to the hydraulic cylinder 10 by a tube/hose/pipe 70. The hydraulic fluid flows in the loop L through the hydraulic cylinder 10 and out of the first outlet 11 and in to the pipe 70 and into the brake 20 via its first end 26. The hydraulic fluid thereafter flows through the brake 20, leaves the brake 20 at its second end 27, and returns to the hydraulic cylinder 10 via the pipe 70 and its second outlet 12. The hydraulic fluid can also flow in the opposite direction. The hydraulic fluid thus flows in the loop L back and forward between the hydraulic cylinder 10 and the brake 20 as the piston 15 is moved back and forward by the door 2. The loop L is filled with the hydraulic fluid.

The hydraulic cylinder 10 is configured to be connected to the vehicle door 2 and to the chassis 4 of the vehicle 3 and to push the hydraulic fluid in the loop L when the vehicle door 2 is moved between the open and closed position O, C.

The brake 20 according to an aspect is disclosed in FIG. 5-8, to which now is referred to. The brake 20 comprises a first chamber 21, a second chamber 22, a third chamber 23 and a ball element 24. The first chamber 21 is hydraulically connected to the loop L. The second chamber 22 is hydraulically connected to the loop L. The third chamber 23 has a circular cross section. Put in another way, at least a part of the third chamber has a cross section that is round or circular shaped. The third chamber is according to an aspect cylindrically shaped. The third chamber 23 is connected to the loop L. The third chamber 23 is in a first end 23a hydraulically connected to the first chamber 21 and in a second end 23b hydraulically connected to the second chamber 22. The hydraulic fluid flowing through the brake 20 in one direction flows into the brake 20 at its first end 26 into the first chamber 23, through the first chamber 21 into the third chamber 23, thereafter through the third chamber 23 into the second chamber 22 and thereafter through the second chamber 22 and leaving the brake 20 at its second end 27. When the hydraulic fluid flow in the opposite direction it will pass through the first, second and third chambers 21, 22, 23 of the brake 20 in the opposite order.

According to an aspect a cross sectional area of the first chamber 21 and a cross sectional area of the second chamber 22 is larger than a cross sectional area of the third chamber 23. According to an aspect a volume of the first chamber 21 and the second chamber 22 is larger than a volume of the third chamber 23. According to an aspect the first and the second chambers 21, 22 have a cylindrical shape. The cylindrical shape has a round shape in a cross sectional direction to the flow in the loop L. The diameter of the third chamber 23 is smaller than the diameter of the first and second chamber 21, 22. The diameter of the circular cross section of third chamber 23 is smaller than the diameter of a circular cross section of the first and second chamber 21, 22.

According to an aspect the first and second chamber 21, 22 comprises a cone shaped part 25 at the transition from the first and second chambers 21, 22 to the third chamber 23. A diameter of the first and second chambers 21, 22 are larger than a diameter of the third chamber 23 and the cone shaped part 25 connects the two diameters of the first and second chamber 21, 22 and the third chamber 23.

The first chamber 21 is in a first end 21a connected to the first outlet 11 of the hydraulic cylinder 10. The second chamber 22 is in a first end 22a connected to the second outlet 12 of the brake 10.

According to an aspect the circular cross sectional shape of the third chamber 23 have a diameter D3 corresponding to the diameter D1 of the ball element 24. According to an aspect the third chamber 23 has a cylindrical shape with a diameter D3 corresponding to the diameter D1 of the ball element 24. According to an aspect the third chamber 23 have an hourglass shape with a smallest cross sectional diameter D3 corresponding to the diameter D1 of the ball element 24. According to an aspect the third chamber 23 has a shape that is a combination of the hourglass shape and the cylindrical shape. As the diameter D1 of the ball element 24 corresponds to the diameter D3 of the third chamber 23 in the part with smallest diameter of the cross section, the flow of hydraulic fluid through the third chamber 23 is restricted when the ball element 24 is positioned in the third chamber 23. The hydraulic fluid has to push on the ball element 24 and move it towards the first or second chamber 21, 22 to decrease the flow resistance in the loop L, as is disclosed in FIGS. 7 and 8. According to an aspect, when the third chamber 23 have a hourglass shape (or a mix of the hourglass and the cylindrical shape) it can be designed to allow a flow of hydraulic fluid to pass the ball element 24 even when it is positioned in the third chamber 23. The flow should be small in comparison to the flow when the ball element 24 is moved towards the first or second chamber 21, 22.

The ball element 24 has a spherical shape. The ball element 24 is configured to be positioned in the third chamber 23 when the hydraulic fluid is still. The ball element 24 is configured to be moved by the hydraulic fluid towards the first chamber 21 as the hydraulic fluid flows in the first direction in the loop L. The ball element 24 is configured to be moved by the hydraulic fluid towards the second chamber 22 as the hydraulic fluid flows in a second direction in the loop L.

A flow resistance of the flow of the hydraulic fluid in the loop L is larger when the ball element 24 is positioned in the third chamber 23 than when the ball element 24 is moved towards the first or the second chamber 21, 22. The flow resistance of the flow of the hydraulic fluid affects the force that has to be exerted on the piston 15 of the hydraulic cylinder 10 to push the hydraulic fluid in the loop L. If the flow resistance is increased, the force exerted on the piston 15 has to be increased to move the piston and if the flow resistance is decreased, the force on the piston could be lowered and the piston 15 could still be moved. The force that has to be exerted on the piston 15 to move it directly affects the force that has to be exerted to the door 2 of the vehicle 3 to move it between the open and closed position O, C.

According to an aspect the brake 20 comprises a first resilient element 31 and a second resilient element 32. The first resilient element 31 is configured to exert a counteracting force on the ball element 24 when it is moved towards the first chamber 21. The second resilient element 32 is configured to exert a counteracting force on the ball element 24 when it is moved towards the second chamber 22. According to an aspect the first and second resilient element 31, 32 is a spring. According to an aspect the first and second resilient element 31, 32 is a coil spring. According to an aspect the first resilient element 31 is positioned in the first chamber 21 and configured to exert a force on the ball element 24 to move it towards the third chamber 23. According to an aspect the second resilient element 32 is positioned in the second chamber 22 and configured to exert a force on the ball element 24 to move it towards the third chamber 23. According to an aspect the first and the second resilient elements 31, 32 are configured to interact to position the ball element 24 in the third chamber 23 when the hydraulic fluid is still in the loop L. According to an aspect a length and a spring force of the first resilient element 31 is equal to a length and a spring force of the second resilient element 32.

According to an aspect the first second chamber 21 comprises a flow-regulating element 40. According to an aspect the second chambers 22 comprise a flow-regulating element 40. Put in another way, the brake 20 comprise two flow-regulating elements 40. The flow-regulating elements 40 are moveable between a first position and a second position in the first and second chamber 21, 22. The flow resistance of the flow of the hydraulic fluid in the loop L is larger when the flow-regulating element 40 is positioned in the first position, see FIGS. 4 and 5, than when it is positioned in the second position, see FIG. 7.

According to an aspect the flow-regulating element 40 has a ring shape. According to an aspect the flow-regulating element comprise a central hole 41. According to an aspect a diameter D1 of the ball element 24 is larger than a diameter D2 of the central hole 41.

According to an aspect the first chamber 21 comprises a third resilient element 33. According to an aspect the second chamber 22 comprises a third resilient element 33. According to an aspect the third resilient elements 33 are a spring. According to an aspect the third resilient elements 33 are a coil spring. According to an aspect the third resilient elements are configured to exert a counteracting force on the flow-regulating element 40 when it is moved from the first position towards the second position. According to an aspect the third resilient element 33 is pre-tensioned in the first position of the flow-regulating element 40. The third resilient element 33 thus exerts a force on the flow-regulating element 40 in the first position that has to be overcome before the flow-regulating element 40 starts to move. This will give the vehicle door 2 a more stiff and robust feeling, as the user needs to exert a force corresponding to the pre-tensioning force before the vehicle door 2 starts to move.

According to an aspect the first chamber 21 comprises a lock 50. According to an aspect the second chamber 22 comprises a lock 50. The locks 50 are configured to lock the flow-regulating element 40 in the second position.

According to an aspect the lock 50 comprises a hook 51 and a flange 52. The flange 52 is configured to interact with the hook 51 to lock the flow-regulating element 40 in the second position. According to an aspect the hook 51 is mounted on the flow-regulating element 40. According to an aspect the hook 51 is connected to one end of a flexible pin that in the other end is mounted on the flow-regulating element 40.

According to an aspect the lock 50 comprise an unlocking device 53. The unlocking device 53 is configured to unlock the flow-regulating element 40. According to an aspect unlocking device 53 is configured to unlock the flow-regulating element 40 in the second position According to an aspect the unlocking device 53 comprises a pin 53 configured to interact with the hook 51 and to unhook it from the flange 52 to unlock the lock 50, as disclosed in FIG. 8. The unlocking device 53 and the flange 52 are not circumferential in the first and second chamber 21, 22 and does thus let the hydraulic fluid pass it, as can be seen in FIG. 6.

According to an aspect the first chamber 21 comprises a fourth resilient element 34. According to an aspect the second chamber 22 comprises a fourth resilient element 34. The fourth resilient elements 34 are each connected to the unlocking device 53 of the chamber 21, 22 that it is positioned in. The fourth resilient elements 34 makes contact with the unlocking device 53 of the chamber 21, 22 and is configured to push on the unlocking device 53. According to an aspect the fourth resilient elements 34 are a spring. According to an aspect the fourth resilient elements 34 are a coil spring. The fourth resilient elements 34 are configured to exert a force on the unlocking device 34 to move it towards the flow-regulating element 40. The fourth resilient elements 34 are according to an aspect configured to move the unlocking device 53 towards the hook 51 and interact with the hook 51, such that the hook 51 is released from the flange 52 and the lock 50 is unlocked.

According to an aspect the ball element 24 is configured be moved, by the hydraulic fluid, from a position in the third chamber 23, to make contact with the flow-regulating 40 and to move the flow-regulating element 40 from the first position to the second position and to lock the lock 50, wherein the flow resistance in the loop L is lower after the flow resistance element 40 has been locked in the second position than when it is in the first position and when it is moved from the first position towards the second position.

Figure 5:
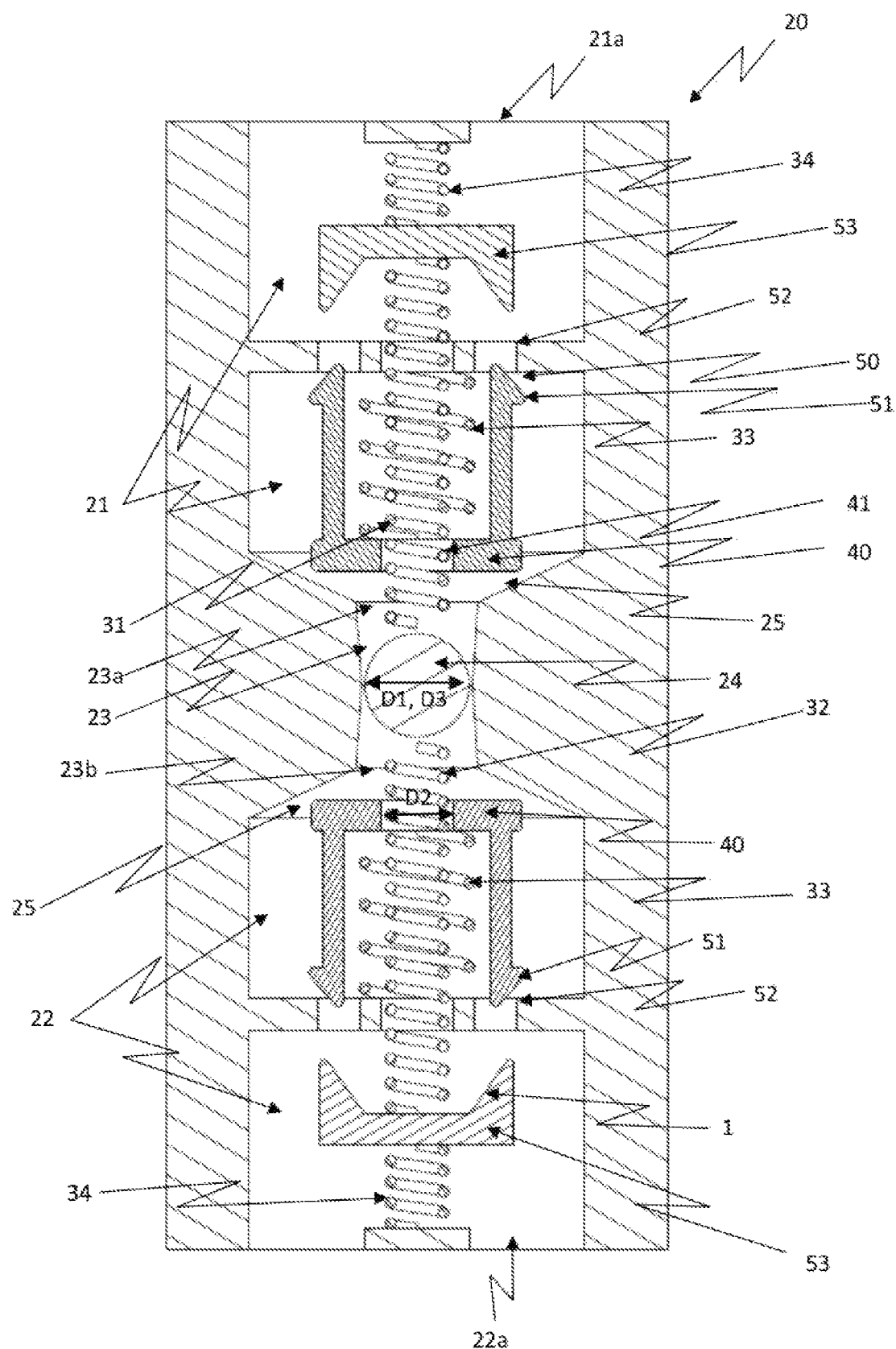
FIG. 5 discloses a cross sectional view of a brake of a vehicle door positioning holder according to the invention with a ball positioned in the third chamber.
Figure 6:
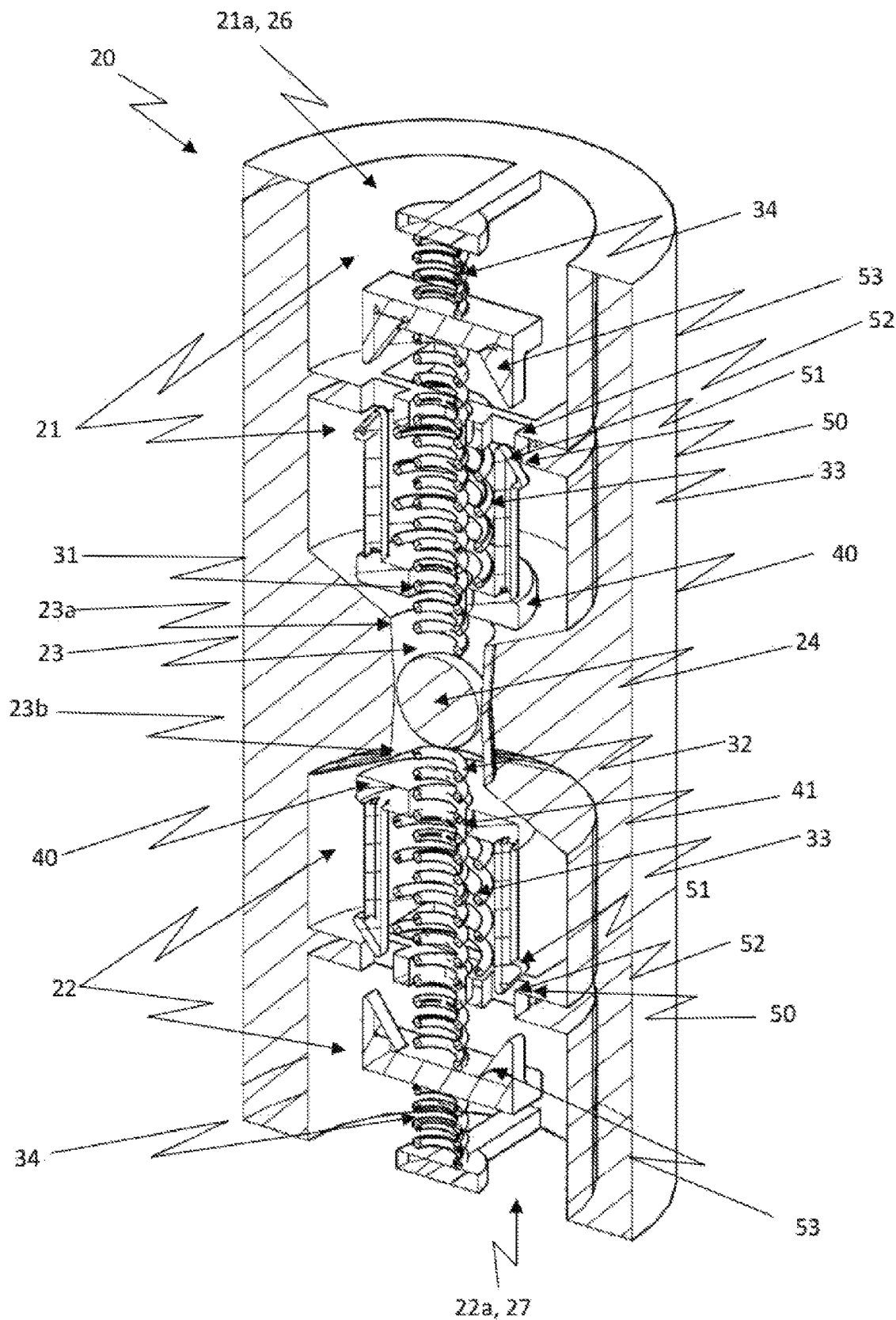
FIG. 6 discloses a 3D cross sectional view of a brake in FIG. 5.
Figure 7:
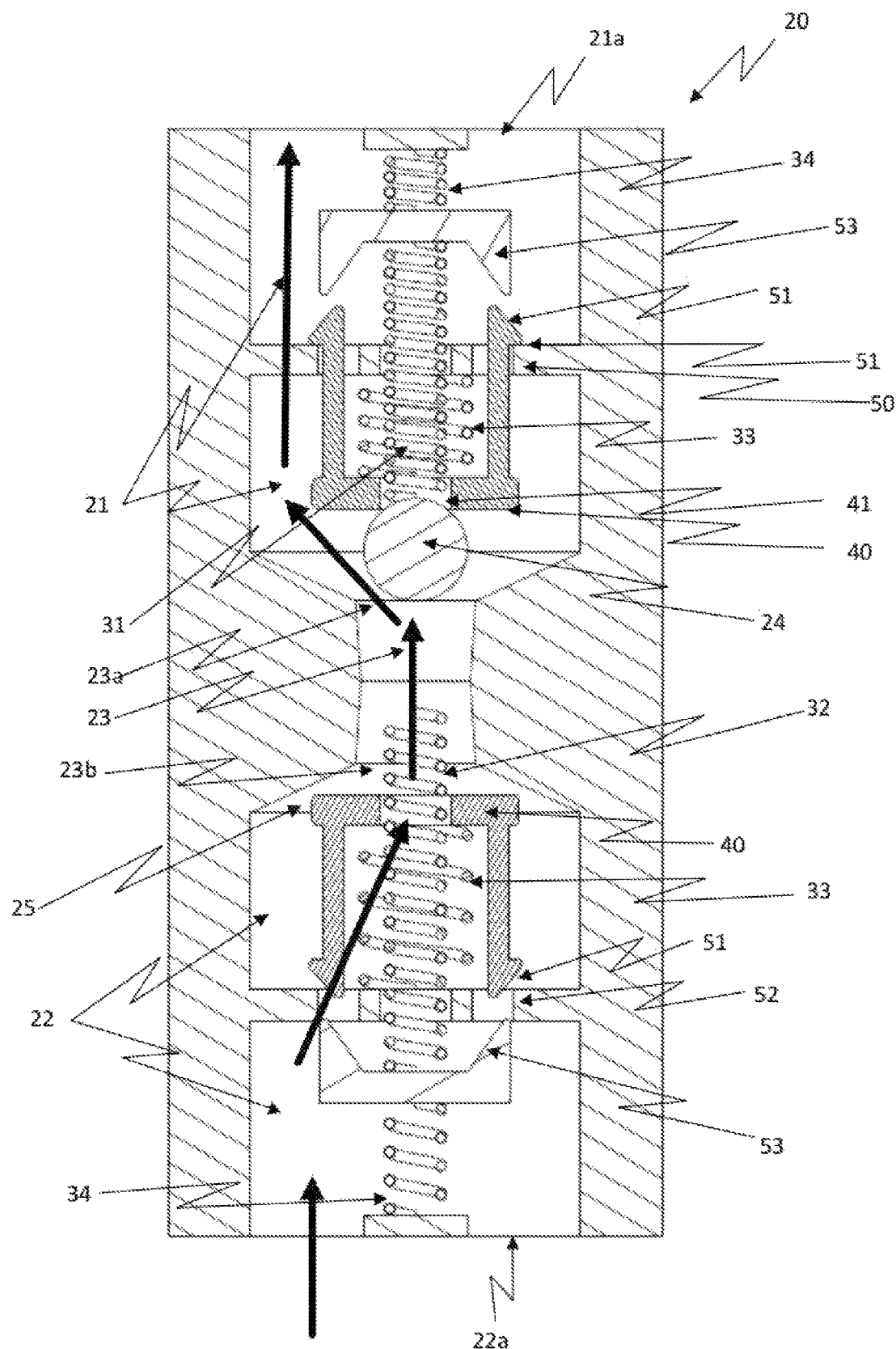
FIG. 7 discloses a cross sectional view of the brake in FIG. 5 with the ball positioned in the first chamber.
Figure 8:
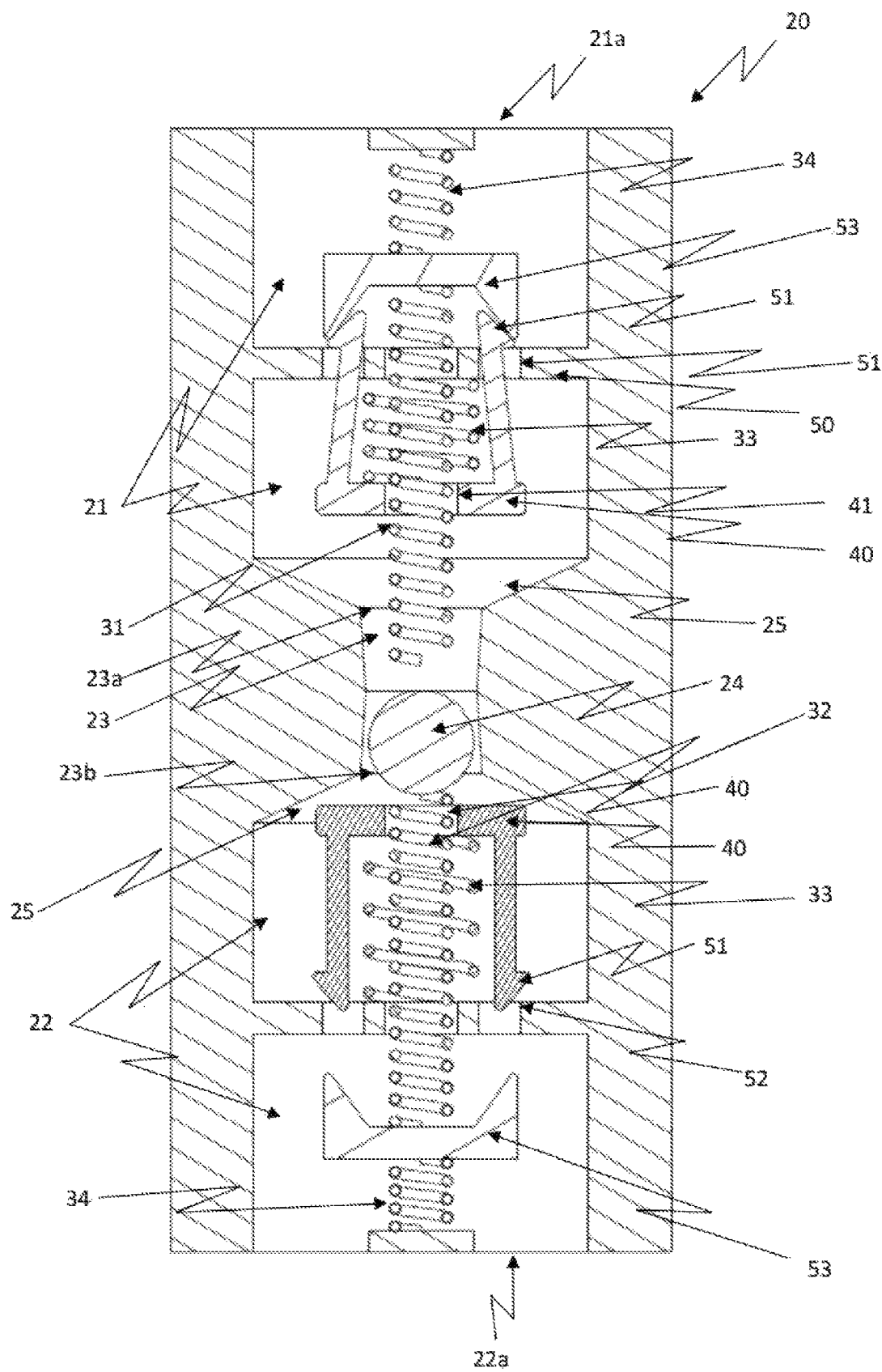
FIG. 8 discloses a cross sectional view of the brake in FIG. 5 with the ball moving towards the second chamber.

When the vehicle door positioning holder 1 is still, the brake 20 is in a passive state and the first, second, third and fourth resilient elements 31, 32, 33, 34 is in an uncompressed state and the ball element 24 is positioned in the third chamber 23, as is disclosed in FIGS. 5 and 6. According to an aspect the first, second, third and fourth resilient elements 31, 32, 33, 34 is in an compressed state and the ball element 24 is positioned in the third chamber 23 in the passive state. According to an aspect the first, second, third and fourth resilient elements 31, 32, 33, 34 are pre-tensioned in the passive state. The passive state is independent of the position of the position of the door 2 of the vehicle 2 as long as the hydraulic fluid in the loop L is still.

When a user sitting in the vehicle 2 intends to move the door 2, for instance between the closed positon C and the intermediate position I, the user grabs the door 2 and pushes it from the closed position C towards the intermediate position I. The force from the push on the door 2 is transferred from the door 2 to the vehicle door position holder 1 as it is connected to the chassis 4 and the door 2 of the vehicle 3. The force exerted on the vehicle door position holder 1 will push on the piston 15, which in turn will exert a force on the hydraulic fluid to flow in the first direction of the loop L.

In the passive position, the ball element 24 is positioned in the third chamber 23 and restricts the flow of hydraulic fluid in the loop L. The hydraulic fluid pushes on the ball element 24 and moves the ball element 24 towards the first chamber 21. As the ball element is moved towards the first chamber 21 it will compress the first resilient element 31. When the ball element 24 partly enters into the first chamber 21, it will make contact with the flow-regulating element 40. The ball element 24 will restrict the flow through the central hole 41 as the diameter D1 of the ball element 24 is larger than the diameter D2 of the central hole 41. Thereafter the hydraulic fluid will push the ball element 24 and the flow-regulating element 40 away from the third chamber 23. As the ball element 24 is moved, the first resilient element 31 is further compressed and as the flow-regulating element 40 is moved also the third resilient element 33 of the first chamber 21 is compressed. In this position, the door 2 has only been moved a short distance, or no distance according to an aspect, as the flow of hydraulic fluid is low due to a high flow resistance in the brake 20. According to an aspect the flow of hydraulic fluid is zero or substantial zero in this position. The user pushing on the door 2 thus has to overcome the resilient force of both the first and the third resilient element 31, 33 to move the door 2. If the user lets go of the door 2 in this position the door 2 will stand still and the brake 20 will return to the passive state.

If the user continues to push on the door 2, the ball element 24 and the flow-regulating element 40 will move further from the third chamber 23 and compress the first and third resilient elements 31, 33. After a distance, the lock 50 of the first chamber will lock the flow-regulating element 40 in the second position. When the flow-regulating element 40 is moved away from the third chamber 23, the hook 51 will make contact with the flange 52. The hook 51 will flex inwards as it is moved passed the flange 52 and after it has passed the flange 52 it flexes back. In this position, the hook 51 interacts with the flange 52 and restricts the flow-regulating element 40 to be moved towards the third chamber 23. The third resilient element 33 exert a force on the flow-regulating element 40 trying to move it towards the third chamber 23, but the lock 50 is now locked and restrict movement of the flow-regulating element 40. In this position, the hydraulic fluid can flow with a lower flow resistance in the loop L and the door 2 of the vehicle 2 can be moved by the user by pushing on the door 2. In this position, the hydraulic fluid enters into the brake 20 at the first end 22a of the second chamber 22 and flows through the central hole 41 of the flow-regulating element 40 in the second chamber 22 and into the third chamber 23. As the ball element 24 has been moved out of the third chamber 23 the hydraulic fluid flow with a low flow resistance also through the third chamber 23 and into the first chamber 21. The hydraulic fluid flows on an outside of the ball element 24 and the flow-regulating element 40 in the first chamber 21 and thereafter exits the brake 20 in at the first end 21a of the first chamber 21. This flow is indicated with arrows in FIG. 7. The door 2 can thus be moved by the user with a lower force than when the brake 20 is in the passive position.

When the user has moved the door 2 to a desired position, the user holds the door 2 still. The fourth resilient element 34 will then have the strength to move the unlocking element 53 towards the hook 51 as the hydraulic flow in the loop L is still or low. According to an aspect the user slightly moves the door 2 in the opposite direction to stop the door 2. The movement will cause the hydraulic fluid to flow in the opposite direction in the loop L and assist the fourth resilient element 34 to move the unlocking element 53 towards the hook 51. As the unlocking element 53 is moved towards the hook 51, it will make contact with the hook 51 and flex it inwards such that the hook 51 will come out of contact with the flange 51. In this position, the lock 50 is unlocked. The third resilient element 33 will push the flow-regulating element 40 and the ball element 24 towards the third chamber 23. In addition, the first resilient element 31 will exert a force on the ball element 24 and move it towards the third chamber 24. The third resilient element 33 will move the flow-regulating element 40 back to its passive position. The first resilient element 31 will move the ball element 23 back into the third chamber 23 to its passive position. In this position, the brake 20 will have a flow resistance in the loop L that makes the door 2 to hold its position until a force that is larger than the flow resistance is applied to the door 2 to repeat the steps above.

If the door 2 is moved in the opposite direction, the opposite to the above will occur and the flow in the loop L will flow towards the second chamber 22 and the corresponding will occur to move and position the door 2 in the intermediate position I.

The door 2 can thus be smoothly opened to any position between the closed position C and the open position O and when a desired position of the of the door 2 is reached the user of the vehicle occupant can slightly pull the door 2 in a opposite direction to lock the door 2 into the preferred position and the door 2 then gets locked. When trying to close the door 2, the hydraulic fluid flows in the opposite direction causing the unlocking element 53 to move towards the hock 51 and to push the hook 51, which then unhooks from the flange 52 and releases the third resilient element 33. Furthermore, to close the door 2 again, or open it more, the user needs to overcome the force of the first and third or second and third resilient elements 31, 33; 32, 33 to get the door 2 moving again. Moreover, when the ball element moves inside the third chamber 23, there won't be much or any hydraulic fluid passing thru, in fact the ball element 24 according to an aspect would need to be pushed out of the third chamber 23 into the cone shaped part 25 of the first or second chamber 21, 22 in order to let the hydraulic fluid flow freely in the loop L.

According to an aspect the third resilient element 33 is pre-tensioned to hold the ball element 24 in the first position.

According to an aspect a force is exerted on the third resilient element 33 when the vehicle door 2 is in the closed position, such that the ball element 24 easily could be moved towards the third resilient element 33 when the vehicle door 2 is opened without the user needs to overcome the force of the third resilient element 33 before the vehicle door 2 could be moved. In the closed position C of the vehicle door 2, the vehicle door 2 is hold in the closed position C with additional locks.

According to an aspect the flow of hydraulic fluid that is allowed to pass the ball element 24 when it is positioned in the third chamber 23 is used to move the unlocking element 53 and to unlock the lock 50.

According to an aspect the ball element 24 is the part that is stopping the flow of hydraulic fluid in the loop L, and one or more of the other elements in the brake 20 is perforated in order to achieve a larger cross-section for the hydraulic fluid to flow through.

Although the invention has been described in relation to a car and a vehicle, the invention is not restricted to vehicles, but may as well be installed in other type of doors or hatches.

The description of the aspects of the disclosure provided herein has been presented for purposes of illustration. The description is not intended to be exhaustive or to limit aspects of the disclosure to the precise form disclosed, and modifications and variations are possible in light of the above teachings or may be acquired from practice of various alternatives to the provided aspects of the disclosure. The examples discussed herein were chosen and described in order to explain the principles and the nature of various aspects of the disclosure and its practical application to enable one skilled in the art to utilize the aspects of the disclosure in various manners and with various modifications as are suited to the particular use contemplated. The features of the aspects of the disclosure described herein may be combined in all possible combinations of methods, apparatus, modules, systems, and computer program products. It should be appreciated that the aspects of the disclosure presented herein may be practiced in any combination with each other.

It should be noted that the word "comprising" does not necessarily exclude the presence of other elements or steps than those listed. It should further be noted that any reference signs do not limit the scope of the claims.

What is claimed is:

1. A vehicle door positioning holder for positioning a vehicle door in an open position, comprising a hydraulic cylinder and a brake hydraulically connected in a loop to the hydraulic cylinder, wherein:
   the hydraulic cylinder is configured to be connected to the vehicle door and to a chassis of the vehicle and to push a hydraulic fluid in the loop when the vehicle door is moved between the open and closed position,
   the brake comprises a first chamber hydraulically connected to the loop and a second chamber hydraulically connected to the loop, and a third chamber with a circular cross section and connected in the loop by that it in a first end is hydraulically connected to the first chamber and in a second end is hydraulically connected to the second chamber,
   the brake further comprises a ball element configured to be
      positioned in the third chamber when the hydraulic fluid is still,
      moved by the hydraulic fluid towards the first chamber as the hydraulic fluid flows in a first direction in the loop, and
      moved by the hydraulic fluid towards the second chamber as the hydraulic fluid flows in a second direction in the loop,
   wherein
   a flow resistance of the flow of the hydraulic fluid in the loop is larger when the ball element is positioned in the third chamber than when the ball element is moved towards the first or the second chamber.

2. The vehicle door positioning holder according to claim 1, wherein the brake comprises a first resilient element configured to exert a counteracting force on the ball element when it is moved towards the first chamber and a second resilient element configured to exert a counteracting force on the ball element when it is moved towards the second chamber.

3. The vehicle door positioning holder according to claim 2, wherein the first and the second resilient elements are configured to interact to position the ball element in the third chamber when the hydraulic fluid is still in the loop.

4. The vehicle door positioning holder according to claim 1, wherein a cross sectional area of the first chamber and the second chamber is larger than a cross sectional area of the third chamber.

5. The vehicle door positioning holder according to claim 1, wherein the first and the second chambers comprises a flow-regulating element moveable between a first position and a second position and wherein the flow resistance of the flow of the hydraulic fluid in the loop is larger when the flow-regulating element is positioned in the first position than when it is positioned in the second position.

6. The vehicle door positioning holder according to claim 5, wherein the regulating element has a ring shape with a central hole, wherein a diameter of the ball element is larger than a diameter of the central hole.

7. The vehicle door positioning holder according to claim 5, wherein the first and the second chambers comprises a third resilient element configured to exert a counteracting force on the flow-regulating element when it is moved from the first position towards the second position.

8. The vehicle door positioning holder according to claim 7, wherein third resilient element is pre-tensioned to hold the ball element in the first position.

9. The vehicle door positioning holder according to claim 5, wherein the first and the second chambers comprises a lock configured to lock the flow-regulating element in the second position.

10. The vehicle door positioning holder according to claim 9, wherein the lock comprises a hook and a flange configured to interact with the hook to lock the flow-regulating element in the second position.

11. The vehicle door positioning holder according to claim 9, wherein the lock comprises an unlocking device configured to unlock the flow-regulating element from the second position.

12. The vehicle door positioning holder according to claim 11, wherein the first and the second chambers comprise a fourth resilient element connected to the unlocking device and wherein the fourth resilient element is configured to exert a force on the unlocking device to move it towards the flow-regulating element and to unlock the flow-regulating element.

13. The vehicle door positioning holder according to claim 1, wherein the third chamber has a cylindrical shape, an hourglass shape or a mix of a cylindrical and hourglass shape with a smallest diameter corresponding to the diameter of the ball element.

14. The vehicle door positioning holder according to claim 9, wherein the ball element is configured to be moved, by the hydraulic fluid, from a position in the third chamber, to make contact with the flow-regulating element and to move the flow-regulating element from the first position to the second position and to lock the lock, wherein the flow resistance in the loop is lower after the flow-regulating element has been locked in the second position than when it is in the first position and when it is moved from the first position towards the second position.

15. The vehicle door positioning holder according to claim 1, wherein the first and the second chambers have a cylindrical shape.

16. The vehicle door positioning holder according to claim 1, wherein the first and second chamber comprises a cone shaped part at the transition from the first and second chambers to the third chamber.

17. The vehicle door positioning holder according to claim 1, wherein the first chamber in a first end is connected to a first outlet of the hydraulic cylinder and the second chamber in a first end is connected to a second outlet of the hydraulic cylinder.

\* \* \* \* \*